(12) United States Patent
Takabayashi et al.

(10) Patent No.: US 7,080,900 B2
(45) Date of Patent: Jul. 25, 2006

(54) DEVICE AND METHOD FOR RECORDING IMAGES

(75) Inventors: Toshiyuki Takabayashi, Tokyo (JP); Satoshi Masumi, Tokyo (JP)

(73) Assignee: Konica Minolta Holdings, Inc., Tokyo (JP)

( * ) Notice: Subject to any disclaimer, the term of this patent is extended or adjusted under 35 U.S.C. 154(b) by 237 days.

(21) Appl. No.: 10/715,464

(22) Filed: Nov. 19, 2003

(65) Prior Publication Data
US 2004/0101291 A1 May 27, 2004

(30) Foreign Application Priority Data
Nov. 20, 2002 (JP) .............................. 2002-337050

(51) Int. Cl.
*B41J 2/01* (2006.01)
(52) U.S. Cl. .................................... 347/102
(58) Field of Classification Search ........ 347/102–105, 347/9, 10, 100; 427/508, 511
See application file for complete search history.

(56) References Cited

U.S. PATENT DOCUMENTS 6,457,823 B1 * 10/2002 Cleary et al. ............... 347/102
6,786,589 B1 * 9/2004 Suzuki et al. ............... 347/102

FOREIGN PATENT DOCUMENTS

| JP | 60-132767 | 7/1985 |
| JP | 08-248561 | 9/1996 |
| JP | 09-034106 | 2/1997 |

* cited by examiner

*Primary Examiner*—Shih-wen Hsieh
(74) *Attorney, Agent, or Firm*—Finnegan, Henderson, Farabow, Garrett & Dunner, L.L.P.

(57) ABSTRACT

There is provided an image recording device which is compact, high in image recording efficiency, low in power consumption, and capable of recording a good image even on a recording medium made of a heat shrinkable material. In an image recording device 1 which records an image on a recording medium 4 by irradiating it with ultraviolet rays by an ultraviolet-ray irradiation device 20 to cure an ink, an ultraviolet light source comprises a light emitting diode which generates ultraviolet rays having an emission wavelength peak in a range between 305 and 375 nm and a maximum illuminance in a range between 40 and 1000 mW/cm$^2$ on a surface of the recording medium.

22 Claims, 2 Drawing Sheets

DEVICE AND METHOD FOR RECORDING IMAGES

BACKGROUND OF THE INVENTION

1. Field of the Invention

The present invention relates to a device and a method for recording images, and more particularly, relates to a device and a method for recording images by radiating ultraviolet rays to cure an ink.

2. Description of the Prior Arts

As an image recording device of an ink jet type, there has recently been used an image recording device which comprises a recording head having a nozzle disposed for discharging an ultraviolet-ray curable ink which is cured with irradiation of ultraviolet rays, and an ultraviolet-ray irradiation device for irradiating the ultraviolet-ray curable ink with ultraviolet rays to cure it (e.g., Japanese Patent Application Laid-Open No. 132767/1985). The recording head is mounted on a carriage which is movably supported on a rod-like guide rail disposed in the image recording device, and ultraviolet-ray irradiation devices are disposed on both sides of the carriage. Thus, the image recording device records an image by driving the carriage to reciprocate the recording head, discharging an ink of a required color from the nozzle based on a predetermined image signal to land it on a recording medium, and then irradiating the recording medium with ultraviolet rays by the ultraviolet-ray irradiation device to cure the ink. In the conventional image recording device, an ultraviolet-ray irradiation device which comprises an ultraviolet lamp such as a mercury lamp or a metal halide lamp as an ultraviolet light source has been used.

However, the mercury lamp, the metal halide lamp or the like used in the ultraviolet-ray irradiation device has a considerable size. Thus, in the conventional image recording device, a moving speed of the carriage goes down due to a weight of the carriage which holds the ultraviolet-ray irradiation device becomes heavy. Consequently, there is a problem of a reduction in image recording efficiency. Additionally, there is a problem of enlargement of the entire image recording device.

In the conventional image recoding device, heat is generated when ultraviolet rays are radiated from the mercury lamp, the metal halide lamp or the like. Thus, for example, when an image is recorded on a thin film of a soft packing material used for food packing or the like, there is a problem of curling, waving or the like on the thin film.

Furthermore, in the conventional image recording device, there is a problem of large power consumption because of the use of the mercury lamp, the metal halide lamp or the like.

Therefore, an object of the present invention is to provide an image recording device which is compact, high in image recording efficiency, low in power consumption and capable of recoding a good image even on a recording medium made of a heat shrinkable material, and an image recording method.

This application is based upon and claims priority under 35 U.S.C. 119 from the Japanese Patent Application No. 2002-337050 filed in Nov. 20, 2002, at least entire content of which are incorporated herein by reference.

SUMMARY OF THE INVENTION

A first aspect of the present invention which has been developed to solve the above problems is directed to an image recording device, comprising a recording head having a nozzle disposed for discharging an ultraviolet-ray curable ink which is cured as irradiated with ultraviolet rays; and an ultraviolet-ray irradiation device having an ultraviolet light source for generating ultraviolet rays to cure the ultraviolet-ray curable ink, wherein an image is recorded by landing the ultraviolet-ray curable ink discharged from the nozzle on a recording medium and then irradiating the ultraviolet-ray curable ink on the recording medium with ultraviolet rays by the ultraviolet-ray irradiation device to cure the ink; and the ultraviolet light source comprises a light emitting diode which generates ultraviolet rays having an emission wavelength peak in a range between 305 and 375 nm, and a maximum illuminance in a range between 40 and 1000 $mW/cm^2$ on a recording medium surface.

According to the invention, since the ultraviolet light source comprises the light emitting diode which generates ultraviolet rays having a maximum illuminance in a range between 40 and 1000 $mW/cm^2$ on the surface of the recording medium, the recording medium on which the ultraviolet-ray curable ink has landed is irradiated with high-illuminance ultraviolet rays by the compact ultraviolet-ray irradiation device. Additionally, even if it is irradiated with ultraviolet rays by the ultraviolet-ray irradiation device, the recording medium is not heated because the ultraviolet light source comprises the light emitting diode.

A second aspect of the present invention is directed to the above image recording device, wherein the recording head is a serial head system, and the ultraviolet-ray irradiation device is disposed on at least one of front and rear sides of the recording head in a main scanning direction.

According to the invention, since the ultraviolet-ray irradiation device is disposed on at least one of the front and rear sides of the recording head in the reciprocating direction, the recording head and the ultraviolet-ray irradiation device are reciprocated to irradiate the ultraviolet-ray curable ink discharged from the nozzle of the recording head to land on the recording medium with the ultraviolet rays. Since the ultraviolet light source comprises the light emitting diode, and the ultraviolet-ray irradiation device is made lightweight, the ultraviolet-ray irradiation device and the recording head can be moved at a high speed.

A third aspect of the present invention is directed to the above image recording device, wherein the plurality of recording heads are arranged, and the ultraviolet-ray irradiation device is disposed between the respective recording heads.

According to the invention, since the ultraviolet-ray irradiation device is disposed between the recording heads, and a distance between the recording head and the ultraviolet-ray irradiation device is short, the recording medium is irradiated with the ultraviolet rays within a short time after the ultraviolet-ray curable ink is discharged from the nozzle of the recording head to land thereon.

A fourth aspect of the present invention is directed to the above image recording device, wherein the recording head is a line head system, and the ultraviolet-ray irradiation device is disposed on a rear side of the recording head in a conveying direction of the recording medium.

According to the invention, since the ultraviolet-ray irradiation device is disposed on the rear side of the recording head of the line head system in the conveying direction of the recording medium, the recording medium is moved to irradiate the ultraviolet-ray curable ink discharged from the nozzle of the recording head to land on the recording medium with the ultraviolet rays.

A fifth aspect of the present invention is directed to the above image recording device, wherein total power consumption of the ultraviolet-ray irradiation device is less than 1 kw/h.

According to the invention, the image is recorded on the recording medium by low power consumption.

A sixth aspect of the present invention is directed to the above image recording device, wherein the ultraviolet-ray curable ink has a viscosity of 7 to 50 mPa·s at 25° C.

According to the invention, since the ultraviolet-ray curable ink has a viscosity of 7 to 50 mPa·s at 25° C., the ink is stably discharged from the nozzle, and irradiated with the ultraviolet rays to be cured well.

A seventh aspect of the present invention is directed to the above image recording device, wherein the ultraviolet-ray curable ink contains a compound having at least one kind of oxetane ring as photopolymerizable monomer.

According to the invention, since the ink is the ultraviolet-ray curable ink of the cationic polymerization type, the ink is irradiated with ultraviolet rays of a relatively low illuminance to be cured.

An eighth aspect of the present invention is directed to the above image recording device, wherein the ultraviolet-ray curable ink contains 30 to 95 wt % of a compound having at least one kind of oxetane ring, 5 to 70 wt % of a compound having least one kind of oxirane group, and 0 to 40 wt % of at least one kind of vinyl ether compound as photopolymerizable monomers.

According to the invention, since the ink is the ultraviolet-ray curable ink of the cationic polymerization type, the ink is irradiated with ultraviolet rays of a relatively low illuminance to be cured well.

A ninth aspect of the present invention is directed to the above image recording device, wherein the recording medium is made of a material which does not absorb the ultraviolet-ray curable ink.

According to the invention, even on the recording medium of the material which does not absorb the ultraviolet-ray curable ink, the image is recorded by discharging and irradiating the ink with the ultraviolet rays to cure it.

A tenth aspect of the present invention is directed to a method for recording an image, comprising: discharging an ultraviolet-ray curable ink, which is cured as irradiated with ultraviolet rays, from a recording head having a nozzle disposed therein to land on a recording medium; and irradiating the recording medium with ultraviolet rays from an ultraviolet light source which comprises a light emitting diode for generating ultraviolet rays having an emission wavelength peak in a range between 305 and 375 nm and a maximum illuminance in a range between 40 and 1000 mW/cm$^2$ on a surface of the recording medium to cure the ink, thereby recording the image.

According to the invention, since the ultraviolet rays are radiated from the ultraviolet light source which comprises the light emitting diode to generate the ultraviolet rays having a maximum illuminance in a range between 40 and 1000 mW/cm$^2$ on the surface of the recording medium, the ultraviolet-ray curable ink is cured by the high-illuminance ultraviolet rays. Additionally, since the recording medium is irradiated with the ultraviolet rays from the ultraviolet light source which comprises the light emitting diode, the recording medium is not heated.

An eleventh aspect of the present invention is directed to the above method, wherein the recording medium is irradiated with the ultraviolet rays by the ultraviolet-ray irradiation device within 0.001 to 1.0 seconds after the landing of the ultraviolet-ray curable ink on the recording medium.

According to the invention, the ultraviolet rays are radiated before the ultraviolet-ray curable ink is spread on the recording medium.

A twelfth aspect of the present invention is directed to the above method, wherein the amount of an ink droplet discharged from the nozzle is 1 to 15 pl.

According to the invention, a high-definition image is formed.

A thirteenth aspect of the present invention is directed to the above method, wherein a total ink film thickness is 2 to 20 μm after the ultraviolet-ray curable ink landed on the recording medium is irradiated with the ultraviolet rays and is thereby cured.

According to the invention, for example, even if the ultraviolet-ray curable ink is discharged to be cured on a thin film of a soft packing material, no curls or waves are generated, and a texture of the entire print is not lost.

DETAILED DESCRIPTION OF THE PREFERRED EMBODIMENT

The present invention will now be described with reference to FIGS. 1 to 4.

An image recording device 1 has a rod-like guide rail (not shown), and a carriage 2 is supported on this guide rail. The carriage 2 is adapted to be reciprocated in a main scanning direction A by a driving mechanism (not shown). Additionally, in the image recording device 1, a conveying mechanism (not shown) is disposed to convey a recording medium 4 in a sub-scanning direction perpendicular to the main scanning direction A.

Figure 1:
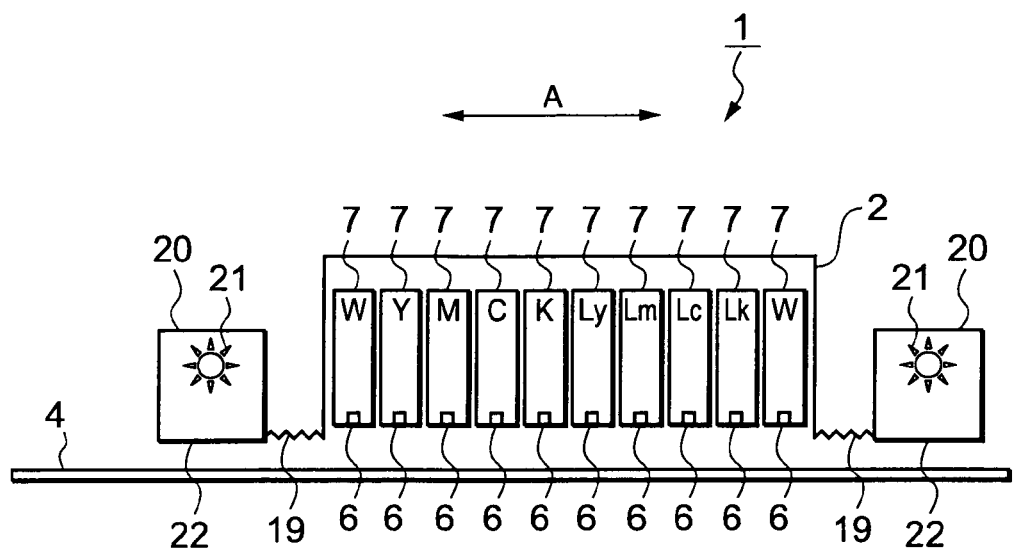
FIG. 1 shows a constitution of an image recording device according to an embodiment of the present invention.

As shown in FIG. 1, recording heads 7 each having a nozzle 6 to discharge an ink are mounted on the carriage 2. The recording heads 7 respectively has an ink of colors: white (W), yellow (Y), magenta (M), cyan (C), black (K), light yellow (Ly), light magenta (Lm), light cyan (Lc), light black (Lk), and white (W).

Figure 2:
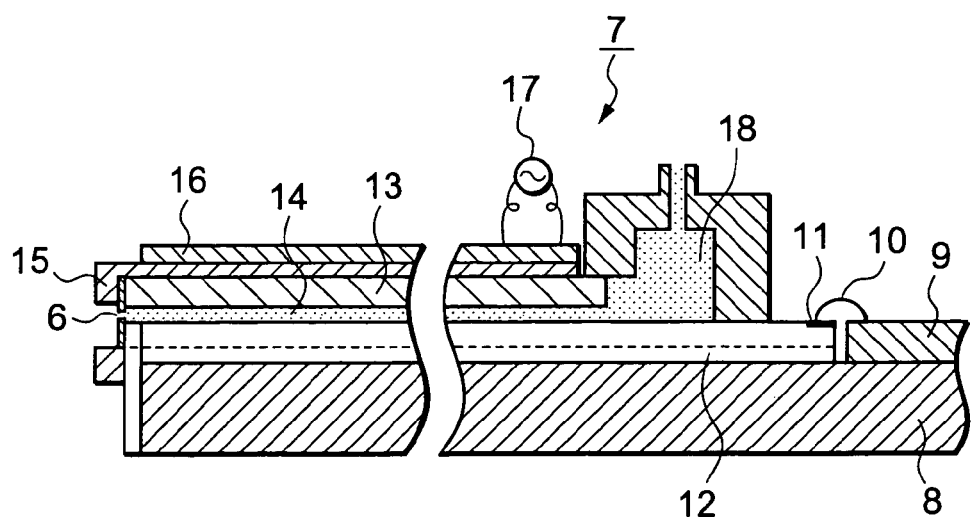
FIG. 2 is a sectional view showing a constitution of a recording head in the image recording device of the invention.

As shown in FIG. 2, the recording head 7 has a substrate 8, and a piezoelectric element 12 is disposed on the substrate 8. A piezoelectric element driving circuit 9 is connected through a lead wire 10 and an electrode 11 to the piezoelectric element 12. A flow path plate 13 is disposed in a position opposite the piezoelectric element 12, and the piezoelectric element 12 and the flow path plate 13 constitute an ink flow path 14. When a pulse signal voltage is applied by the piezoelectric element driving circuit 9, the piezoelectric element 12 is expanded upward to compress the ink flow path 14. A heater 16 is disposed through a heat transfer member 15 on an upper surface of the flow path plate 13. A heater power source 17 is connected to the heater 16. One end of the ink flow path 14 is communicated with the nozzle 16, and the other end is communicated with an ink supply member through a common liquid chamber 18 of a plurality of ink flow paths 14.

A diameter of the nozzle 6 is set in relation to an ink so that the amount of one drop of ink droplets discharged from the nozzle 6 can be 2 pl to 15 pl.

As shown in FIG. 1, ultraviolet-ray irradiation devices 20 are disposed through bellows members 19 on both sides of the carriage 2. The ultraviolet-ray irradiation device 20 has an ultraviolet light source 21 for generating ultraviolet rays with which the ink discharged to the recording medium 4 is irradiated. A filter 22 is disposed on a surface of the ultraviolet-ray irradiation device 20 opposite the recording medium 4 to transmit ultraviolet rays of a specific wavelength. An ultraviolet-ray irradiation device power source 23 (see FIG. 3) is disposed in the ultraviolet-ray irradiation device 20.

The ultraviolet light source 21 comprises a light emitting diode, and can irradiate an area of the recording medium on which the ink discharged from the recording head can land by one scanning. For example, the ultraviolet light source 21 is constituted by arraying four light emitting diode chips of 1 $mm^2$ in a main scanning direction A and twenty in a sub-scanning direction, and each light emitting diode chips irradiates an area of 1 $cm^2$.

In this embodiment, the light emitting diode, which is manufactured by NICHIA Corporation, is used. The emission wavelength peak of the light emitting diode is 365 nm (nominal value), and the maximum luminance of light emitting diode is 100 $mW/cm^2$ on a recording medium surface.

The light emitting diode is preferably constituted such that a wavelength peak is properly selected to allow quick curing of the ink discharged from the recording head 7, and it is set in a range between 305 and 375 nm (nominal value). The light emitting diode is preferably constituted such that an illuminance of emitted ultraviolet rays is set in a range between 40 and 1000 $mW/cm^2$ at a point of time when the ultraviolet rays reach the recording medium 4.

The luminance of the light emitting diode is measured by the spectro illumination photometer, Model UVPF-A1, which is manufactured by IWASAKI ELECTRIC Co., Ltd. In more detail, the spectro illumination photometer is placed apart from the light source in a distance equal to the distance H between the light source and the surface of the recording medium. The luminance of the light emitting diode is measured as equivalence of the luminance on the recording medium.

Figure 3:
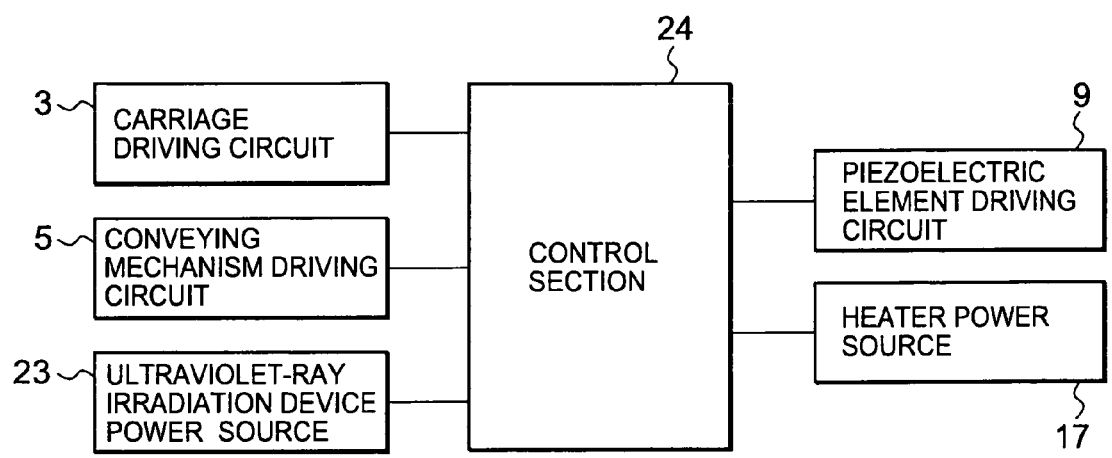
FIG. 3 is a block diagram showing the constitution of the image recording device of the embodiment of the invention.

Additionally, as shown in FIG. 3, the image recording device 1 comprises the piezoelectric element driving circuit 9, the heater power source 17, a carriage driving circuit 3, a conveying mechanism driving circuit 5, and a control section 24 for controlling the ultraviolet-ray irradiation device power source 23.

The control section 24 functions to control the piezoelectric element driving circuit 9 so as to apply a voltage to the required piezoelectric element 12 based on a predetermined image signal.

The control section 24 controls a temperature of the heater 16 by turning ON/OFF the heater power source 17. When the ink is discharged, the heater 16 is preferably heated in terms of ink discharging stability so that the recording head 7 and then the ink can be set to 35° C. to 100° C. Regarding the ultraviolet-ray curable ink, temperature changes cause great fluctuation in viscosity, and the viscosity fluctuation directly affects a droplet size and a droplet injection speed greatly. Thus, the heater power source 17 must be controlled to maintain an ink temperature constant while increasing it. A control range of the ink temperature is ±5° C. of a set temperature, preferably ±2° C. of the set temperature, more preferably ±1° C. of the set temperature.

The piezoelectric element driving circuit 9 and the heater power source 17 are controlled in consideration of ink properties so that the amount of an ink droplet discharged from the nozzle 6 can be set to 1 to 15 pl.

The control section 24 controls the carriage driving circuit 3. The carriage driving circuit 3 operates a driving mechanism of the carriage 2 based on a signal from the control section 24 to reciprocate the carriage 2 in the main scanning direction A. In this case, the control section 24 moves the ultraviolet-ray irradiation device 20 disposed on the carriage 2 at a speed to enable irradiation of the ultraviolet-ray curable ink with ultraviolet rays within 0.001 to 1.0 seconds after the ultraviolet-ray curable ink lands on the recording medium 4, more preferably within 0.01 to 1.0 second, in relation to a length of the carriage 2 in the main scanning direction A.

The control section 24 controls the conveying mechanism driving circuit 5 which operates a conveying mechanism based on a signal from the control section 24 to convey the recording medium 4 in the sub-scanning direction.

Further, the control section 24 controls light emission of the ultraviolet light source 21 by turning ON/OFF the ultraviolet-ray irradiation device power source 23.

The ink for use in the embodiment of the invention will be described hereinafter. The ink for the invention is especially an ink compatible to "Curing System Utilizing Photoacid/base generating Agent (Section 1)", "Photo-induced Alternative Copolymerization (section 2)", and the like of "Photo-curing System (Chapter 4)" described in "Photo-curing Technology: Selection and Mixing Conditions of Resins/Initiators and Measurement/Evaluation of Curing Degree (Technical Society Information)". This ink comprises a color material, a polymerizable monomer, a photoinitiator, and the like, and has a property of being cured by a crosslinking/polymerizing reaction of the monomer by the action, as a catalyst, of the photoinitiator under the irradiation with ultraviolet light. However, in the case that an ink compatible to the above "Photo-induced Alternative Copolymerization (section 2)" as the ink for use in the present embodiment, a photoinitiator may be excluded.

The Ultraviolet-ray curable inks are roughly classified into a radically polymerizable ink containing a radically polymerizable compound and a cationically polymerizable ink containing a cationically polymerizable compound, as polymerizable compounds. Both types of the inks are individually applicable as the ink for use in the present embodiment and also a hybrid-type ink obtainable by combining a radically polymerizable ink and a cationically polymerizable ink may be applicable as the ink for use in the present embodiment.

In the case of the radically polymerizable ink, the radically polymerizable compound necessarily exhibits the following performances: (1) the solubility in water is high, (2) the viscosity is low, (3) it is photopolymerizable, (4) the physical properties of the cured film are excellent, and the like. Radically polymerizable acrylic monomers can be suitably used.

As the radically polymerizable acrylic monomers, N,N-dimethylaminoethyl methacrylate, $CH_2$=$C(CH_3)$—COO—$CH_2CH_2N(CH_3)_2$; N,N-dimethylaminoethyl acrylate, $CH_2$=CH—COO—$CH_2CH_2N(CH_3)_2$; N,N-dimethylaminopropyl methacrylate, $CH_2$=$C(CH_3)$—COO—$CH_2CH_2CH_2N(CH_3)_2$; N,N-dimethylaminopropyl acrylate, $CH_2$=CH—COO—$CH_2CH_2CH_2N(CH_3)_2$; N,N-dimethylaminoacrylamide, $CH_2$=CH—$CON(CH_3)_2$; N,N-dimethylaminomethacrylamide, $CH_2=C(CH_3)-CON(CH_3)_2$; N,N-dimethylaminoethylacrylamide, $CH_2=CH-CONHC_2H_4N(CH_3)_2$; N,N-dimethylaminoethylmethacrylamide, $CH_2=C(CH_3)-CONHC_2H_4N(CH_3)_2$; N,N-dimethylaminopropylacrylamide, $CH_2=CH-CONH-C_3H_6N(CH_3)_2$; N,N-dimethylaminopropylmethacrylamide, $CH_2=C(CH_3)-CONH-C_3H_6N(CH_3)_2$; and quaternized substances thereof; and the like are excellent in a color material-dyeing property and hence are particularly preferable. In addition, ultraviolet-ray curable monomers and oligomers known per se, such as (meth)acrylate esters of polyhydric alcohols, (meth)acrylate esters of glycidyl ethers of polyhydric alcohols, (meth)acrylate esters of polyethylene glycol, (meth)acrylate esters of ethylene oxide adducts of polyhydric alcohols, and reaction products of polybasic acid anhydrides with (meth)acrylate esters having a hydroxyl group are used. Among these substances, a substance having a high compatibility to the ink and a high hydrophilicity is suitably selected and used.

The ultraviolet-ray curable ink contains a compound having at least one of acrylic monomer or methacrylic monomer as a photopolymerizable compound.

The amount of the water-soluble monomer to be used is preferably in the range of 1 to 40% based on the total weight of the ink.

As the method for using a photoinitiator of the radical-based ink, the photoinitiator may be used singly, as a mixture of two or more kinds thereof, or as a combination thereof with a sensitizer. The selection, combination, and mixing ratio of the main photoinitiator and sensitizer may be suitably effected or selected depending on the monomer and apparatus used.

As the main photoinitiator and sensitizer, examples of the photoinitiator include acetophenone, 2,2-diethoxyacetophenone, p-dimethylaminoacetophenone, p-dimethylaminopropiophenone, benzophenone, 2-chlorobenzophenone, p,p'-dichlorobenzophenone, p,p'-bisdiethylaminobenzophenone, Michler's ketone, benzil, benzoin, benzoin methyl ether, benzoin ethyl ether, benzoin isopropyl ether, benzoin n-propyl ether, benzoin isobutyl ether, benzoin n-butyl ether, benzil dimethyl ketal, tetramethylthiuram monosulfide, thioxanthone, 2-chlorothioxantone, 2-methylthioxanthone, azobisisobutyronitrile, benzoin peroxide, di-tert-butyl peroxide, 1-hydroxycyclohexyl phenyl ketone, 2-hydroxy-2-methyl-1-phenyl-1-one, 1-(4-isopropylphenyl)-2-hydroxy-2-methylpropan-1-one, and methyl benzoylformate. The amount to be used is preferably usually 0.1 to 10 weight % based on the total amount of the water-soluble monomers solidified by imparting energy.

In the invention, since a cationically polymerizable ink is more excellent in functionality and versatility wherein the polymerization reaction is not or hardly inhibited by oxygen, a cationically polymerizable ink is mainly used in the present embodiment.

The photopolymerizable compound for use in the cationically polymerizable ink of the invention preferably contains at least one kind of a compound having an oxetane ring.

As the oxetane compound capable of being used in the invention, any of the known oxetane compounds as introduced in Japanese Patent Application Laid-open Nos. 220536/2001 and 310937/2001 may be used.

Moreover, in the cationically polymerizable ink of the invention, it is preferable to contain at least one kind of a compound having an oxirane group, for further improvement of curing property and discharging stability.

Among epoxy compounds, referable aromatic epoxy compounds are di- or poly-glycidyl ether, which is synthesized by the reaction of polyhydric phenol having at least one aromatic core or alkylene oxide-added polyhydric phenol and epichlorohydrin, and for example, di- or poly-glycidyl ether of bisphenol A or of alkylene oxide-added bisphenol A, di- or poly-glycidyl ether of hydrogenated bisphenol A or of alkylene oxide-added hydrogenated bisphenol A, and novolak type epoxy resin, are listed. Herein, as alkylene oxide, ethylene oxide and propylene oxide are listed.

As alicyclic epoxide, a cyclohexene oxide or cyclopentene oxide, which is obtained by epoxidation of the compound having cycloalkane ring such as at least one cyclohexene or cyclopentene ring by the appropriate oxidant such as hydrogen peroxide or peracid, is preferable.

As a preferable aliphatic epoxide, there is di- or poly-glycidyl ether of aliphatic polyvalent alcohol or of alkylene oxide-added aliphatic polyvalent alcohol, and as its representative example, di-glycidyl ether of alkylene glycol such as di-glycidyl ether of ethylene glycol, di-glycidyl ether of propylene glycol and glycidyl ether of 1,6-hexane diol, poly-glycidyl ether of polyvalent alcohol such as di-or tri-glycidyl ether of glycerin or of alkylene oxide added glycerin, and di-glycidyl ether of polyalkylene glycol such as di-glycidyl ether of polyethylene glycol or of alkylene oxide-added polyethylene glycol, and di-glycidyl ether of polypropylene glycol or of alkylene oxide-added polypropylene glycol, are listed. Herein, as alkylene oxide, ethylene oxide and propylene oxide are listed.

In these epoxides, when the quick hardening ability is considered, aromatic epoxide and alicyclic epoxide are preferable, and particularly, alicyclic epoxide is preferable. In the present invention, on kind of the above epoxides may be solely used, and more than 2 kinds of them may also be used by appropriately being combined.

Moreover, in the invention, from the viewpoint of safety such as AMES and sensitizing property, it is preferable to contain at least one of an epoxidized fatty acid ester and an epoxidized fatty acid glyceride as an epoxy compound having an oxirane group.

The epoxidized fatty acid ester or epoxidized fatty acid glyceride may be used without particular limitation as far as the ester is obtained by introducing an epoxy group into an epoxidized fatty acid ester or epoxidized fatty acid glyceride.

The epoxidized fatty acid ester is produced by epoxidizing an oleic acid ester, and methyl epoxystearate, butyl epoxystearate, octyl epoxystearate, or the like is used. Moreover, the epoxidized fatty acid glyceride is also produced by epoxidizing soybean oil, linseed oil, castor oil, or the like, and epoxidized soybean oil, epoxidized linseed oil, epoxidized castor oil, or the like is used.

Furthermore, in the cationically polymerizable ink of the invention, any known vinyl ether compounds may be used.

Also as a vinyl ether compound preferably used in the ink of the present invention, publicly known vinyl ether compounds can be used, and for example, di or tri-vinyl ether compound, such as ethylene glycol di-vinyl ether, di-ethylene glycol di-vinyl ether, tri-ethylene glycol di-vinyl ether, propylene glycol di-vinyl ether, di-propylene glycol di-vinyl ether, butane diol di-vinyl ether, hexane diol di-vinyl ether, cyclohexane di-methanol di-vinyl ether, tri-methylol propane tri-vinyl ether, or mono vinyl ether compound, such as ethyl vinyl ether, n-butyl vinyl ether, iso-butyl vinyl ether, octadecyl vinyl ether, cyclohexyl vinyl ether, hydroxy butyl vinyl ether, 2-ethyl-hexyl vinyl ether, cyclo-hexane di-methanol mono-vinyl ether, n-propyl vinyl ether, isopropyl vinyl ether, iso-propenyl ether-o-propylene carbonate, dodecyl vinyl ether, or di-ethylene glycol mono vinyl ether vinyl ether, is listed.

In these vinyl ether compounds, when the hardenability, adhesion or surface hardness is considered, di or tri-vinyl ether compound is preferable, and particularly di-vinyl ether compound is preferable. In the present invention, one kind of the above vinyl ether compounds may also be used, and more than two kinds of them may also be used by being appropriately combined.

The active light-curable ink for use in the image-forming method of the invention, any known photo-acid generating agents can be used.

As the photo-acid generating agent, the compounds utilized for chemically sensitizable photoresists or photo-cationic polymerization are used, for example (cf. "Organic Materials for Imaging" edited by Organic Electronics Material Study Group, Bunshin Shuppan (1993), pages 187–192). Examples of the suitable compounds for the invention are as follows.

Photo-acid generating agent-1 is used in the following.

As the photo initiator, all publicly known photo acid generators (a compound which generates the acid by the active ray, such as ultraviolet rays) can be used. As the photo acid generator, for example, a chemical amplification type photo resist or compound used for the light cationic polymerization is used (Organic electronics material seminar "Organic material for imaging" from Bunshin publishing house (1993), refer to page 187–192). Examples preferable for the present invention will be listed below.

Firstly, aromatic onium compound $B(C_6F_5)_4^-$, $PF_6^-$, $AsF_6^-$, $SbF_6^-$, $CF_3SO_3^-$ salt, such as diazonium, ammonium, iodonium, sulfonium, phosphonium, can be listed. Specific examples of the onium compounds will be shown below.

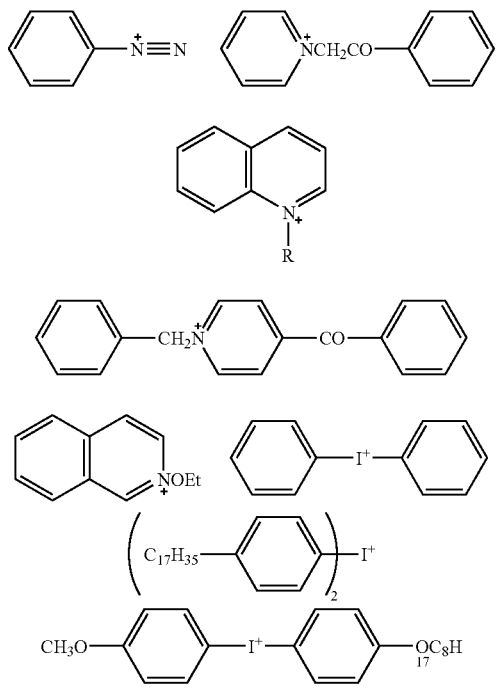

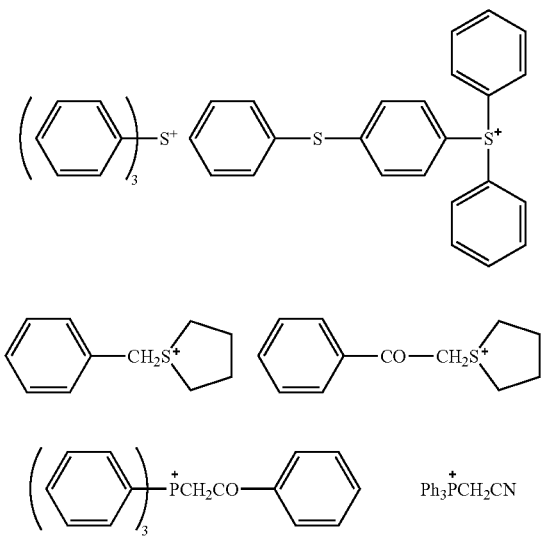

-continued

Secondly, sulfone compounds, which generate sulfonic acid, can be listed. Examples of specific compounds will be shown below.

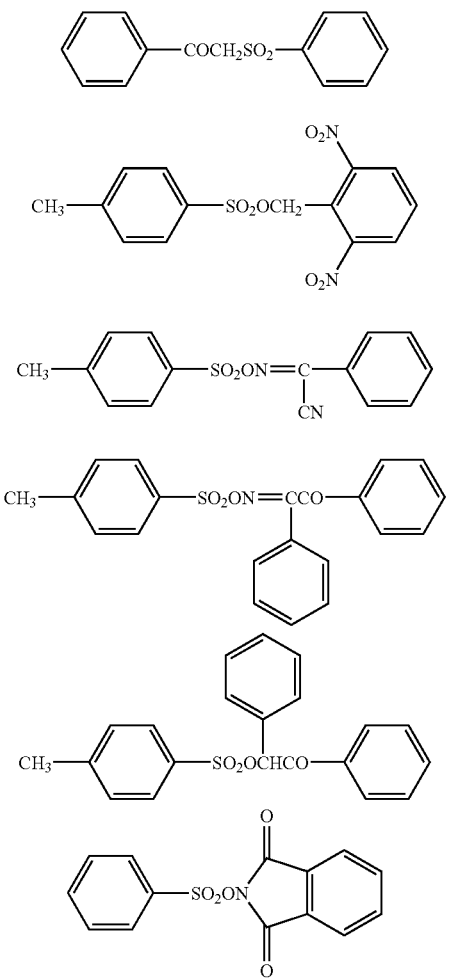

-continued

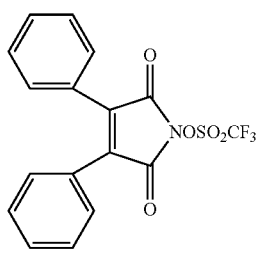

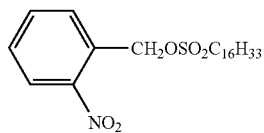

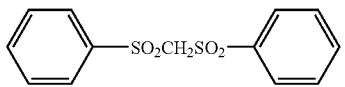

Thirdly, halogenide which generates hydrogen halide can also be used. Examples of specific compounds will be shown below.

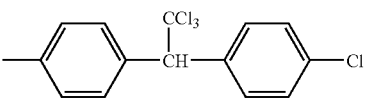

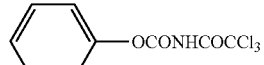

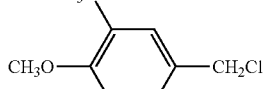

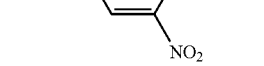

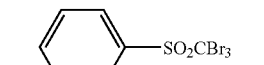

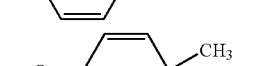

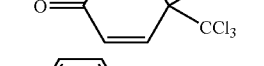

Fourthly, ferrite allene complex can be listed.

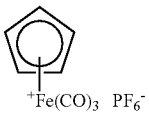

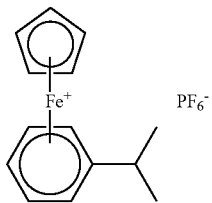

Other than above, other additives can be used in the ink-jet ink of the present invention.

Moreover, it is preferable to contain an acid-multiplying agent which newly generates an acid by the action of the acid generated by the irradiation with an active light as described in Japanese Patent Application Laid-open Nos. 248561/1996 and 34106/1997, and the like.

Additionally, the combined use of a monofunctional oxetane compound containing one oxetane ring and a polyfunctional oxetane compound containing two or more oxetane rings is preferable in view of the improvement of film strength and adhesiveness to recording media after curing.

Furthermore, in the cationically polymerizable ink of the invention, the amounts of the above photopolymerizable monomers to be added is preferably 30 to 95 weight % of at least one compound having an oxetane ring, 5 to 70 weight % of at least one compound having an oxirane ring, and 0 to 40 weight % of at least one vinyl ether compound.

In addition, the ink preferably has a viscosity at 25° C. of 7 to 50 mPa·s in order to stabilize its discharge independent of surrounding temperature and humidity and to obtain a good curability.

The drop of the ink is ejected from the nozzle of the recording head, and is placed on the recording medium. After the placement of the drop of the ink between 0.001 and 1.0 second, more preferably between 0.001 and 0.7 second, the irradiation by the ultraviolet-ray of the ultraviolet-ray irradiation device to the ink is started. As a result, it is possible to obtain a high-resolution image in high repeatability.

The viscosity is measured by MCR (Modular Compact Rheometer) 300 produced by Physica. The above value of the viscosity is obtained at shear rate 1000 (1/S).

The following will describe the recording medium 4 for use in the embodiments in the invention. As the recording medium 4, various papers such as standard paper, recycled paper, and gloss paper, various fabrics, various non-woven fabrics, recording media made of materials such as resin, metal, and glass, which are applied to usual ink-jet recording apparatus, are applicable. Moreover, as the form of the recording medium 4, a roll form, a cut-sheet form, a plate form, or the like may be applicable. In particular, as the recording medium 4 for use in the present embodiment, a transparent or opaque non-absorbable resin film to be used for soft wrapping may be applicable. As the kind of the specific resins of the resin film, polyethylene terephthalate, polyester, polyolefin, polyamide, polyesteramide, polyether, polyimide, polyamideimide, polystyrene, polycarbonate, poly-p-phenylene sulfide, polyetherester, polyvinyl chloride, poly(meth)acrylate ester, polyethylene, polypropylene, Nylon, and the like may be applicable. Furthermore, copolymers of these resins, mixtures of these resins, crosslinked products of these resins, and the like may be also applicable. Of these, as the kind of the resin of the resin film, it is preferable to select any of oriented polyethylene terephthalate, polystyrene, polypropylene, and Nylon in view of the transparency, dimensional stability, rigidity, environmental burden, cost, and the like of the resin film. It is also preferable to use a resin film having a thickness of 2 µm to 100 µm, preferably 6 µm to 50 µm. Moreover, it is possible to subject the surface of the support of the resin film to a surface treatment such as a corona discharge treatment or a treatment for easy adhesion. Furthermore, as the recording medium 4 for use in the present embodiments, opaque known recording media 4 such as various papers whose surface is covered with a resin, films containing a pigment, and foamed films may be applicable.

Next, description will be made of an image recording method of the present invention which uses the image recording device 1 of the embodiment.

The piezoelectric element driving circuit 9 is controlled by the control section 24 based on a predetermined image signal to select a predetermined piezoelectric element 12, and a voltage is applied through the lead wire 10 and the electrode 11 to the selected piezoelectric element 12. Upon the application of the voltage to the piezoelectric element 12, the piezoelectric element 12 is expanded upward, whereby the ink flow path 14 is compressed to discharge the ink from the nozzle 6. At this time, the heater power source 17 is controlled by the control section 24, and the ink is accordingly heated to a predetermined temperature through the heat transfer member 15 and the flow path plate 13 by the heater 16. Thus, the ink the amount of which droplets is 1 to 15 pl is discharged from the nozzle 6.

In this case, the carriage driving circuit 3 is controlled by the control section 24, whereby the driving mechanism of the carriage 2 is operated to reciprocate the carriage 2 above the recording medium 4 in the main scanning direction A, and the discharged ink sequentially lands on the recording medium 4. On the other hand, the power source 23 of the ultraviolet-ray irradiation device 20 disposed on the carriage 2 is controlled by the control section 24 to emit a light from the ultraviolet light source 21 which comprises the light emitting diode. The ultraviolet light source 21 is reciprocated above the recording medium 4 in the main scanning direction A while emitting ultraviolet rays having an emission wavelength peak in a range between 305 and 375 nm (nominal value), and a maximum illuminance in a range between 40 and 1000 mW/cm$^2$ on the surface of the recording medium. Accordingly, the ultraviolet-ray curable ink is irradiated with ultraviolet rays by the ultraviolet-ray irradiation device 20 to be cured within 0.001 to 1.0 seconds after the ultraviolet-ray curable ink lands on the recording medium 4.

The luminance of the light emitting diode is measured by the spectro illumination photometer, Model UVPF-A1, which is manufactured by IWASAKI ELECTRIC Co., Ltd. In more detail, the spectro illumination photometer is placed apart from the light source in a distance equal to the distance H between the light source and the surface of the recording medium. The luminance of the light emitting diode is measured as equivalence of the luminance on the recording medium.

It is preferable that the total power consumption of the ultraviolet-ray irradiation device 20 is less than 1 kw/h in point of view not only electric power consumption, but also irradiating heat from the ultraviolet-ray irradiation device 20.

Then, the conveying mechanism driving circuit 5 is controlled by the control section 24, whereby the conveying mechanism is operated to convey the recording medium 4 in the sub-scanning direction, and an image is recorded on the recording medium 4.

Thus, according to the embodiment of the present invention, since the ultraviolet light source 21 comprises the light emitting diode, the ultraviolet-ray irradiation device 20 can be made lightweight to increase a moving speed of the carriage 2 and image recording efficiency. Since the ultraviolet-ray irradiation device 20 can be made compact, it is possible to miniaturize the entire image recording device 1. Moreover, since the light emitting diode generates no heat, when the ultraviolet-ray curable ink is irradiated with ultraviolet rays, no curls, waves or the like are generated on the thin film even in the case of recording an image on the thin film of the soft packing material, and thus a good image can be obtained. Since the light emitting diode emits a light by small power, power consumption can be suppressed.

The ultraviolet-ray irradiation devices 20 are disposed on both sides of the carriage 2, and the carriage 2 is moved to irradiate the ultraviolet-ray curable ink discharged from the nozzle 6 of the recording head 7 mounted on the carriage 2 to land on the recording medium 4 with ultraviolet rays. Thus, it is possible to easily and surely cure the ultraviolet-ray curable ink.

The ultraviolet-ray curable ink has a viscosity of 7 to 50 mPa·s at 25° C. The ultraviolet-ray curable ink is stably discharged from the nozzle, and cured well when it is irradiated with ultraviolet rays. Thus, it is possible to obtain a good image.

The ink is an ultraviolet-ray curable ink of a cationic polymerization type, and cured when it is irradiated with ultraviolet rays of a relatively low illuminance. Thus, it is possible to obtain a good image by a low illuminance and low power consumption.

The ultraviolet-ray curable ink is irradiated with ultraviolet rays by the ultraviolet-ray irradiation device 20 within 0.001 to 1.0 seconds after it lands on the recording medium 4 to be cured before it is spread on the recording medium 4. Thus, it is possible to obtain a high-definition image.

Since the amount of the ink droplet discharged from the nozzle 6 is 1 to 15 pl, it is possible to obtain a high-definition image.

Since the total ink film thickness is 2 to 20 µm after the ultraviolet-ray curable ink is irradiated with ultraviolet rays to be cured, for example, even if the ultraviolet-ray curable ink is discharged and cured on the thin film of the soft packing material, no curls or waves are generated, and a texture of an entire print is not lost. Thus, it is possible to obtain a good image.

The total ink film thickness is a thickness of a part, which is most thick part of the recording medium.

According to the embodiment of the present invention, the ultraviolet-ray irradiation devices 20 are disposed on both sides of the carriage 2. However, an ultraviolet-ray irradiation device may be disposed between the recording heads 7. Accordingly, because of a short distance between the nozzle 6 and the ultraviolet-ray irradiation device 20, it is possible to irradiate the ultraviolet-ray curable ink with ultraviolet rays within a shorter time after the ultraviolet-ray curable ink is discharged from the nozzle 6 to land on the recording medium 4.

Figure 4:
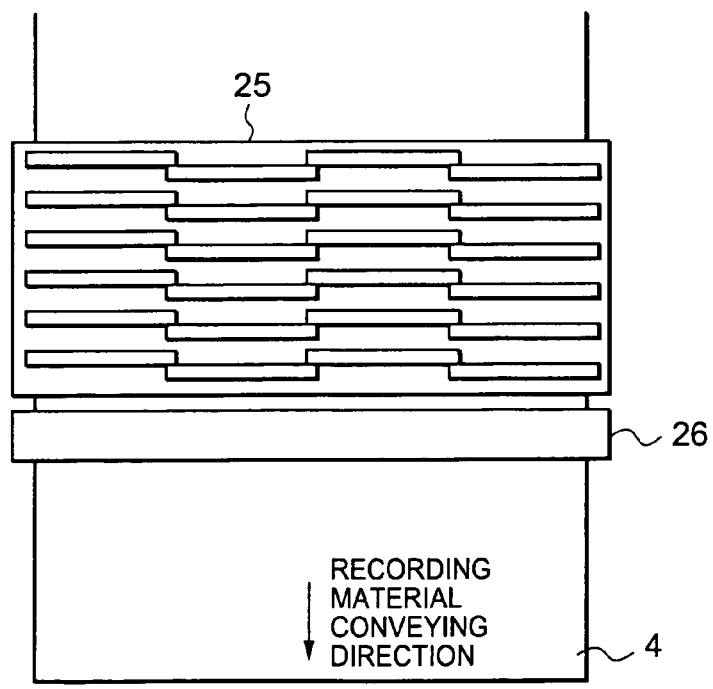
FIG. 4 shows the constitution of the image recording device of the embodiment of the invention.

Furthermore, according to the embodiment of the present invention, the recording head 7 of the serial head type is disposed. However, a recording head of a line head type may be disposed. In this case, as shown in FIG. 4, if an ultraviolet-ray irradiation device 26 is disposed on a downstream side of a recording head 25, the recording medium 4 is conveyed, and an ultraviolet-ray curable ink discharged from a nozzle of the recording head 25 to land on the recording medium 4 is irradiated with ultraviolet rays by the ultraviolet-ray irradiation device 26.

It will become evident from the above description that the recording head of the present invention may be employed in a wide variety of devices and is not specifically limited to the particular embodiment depicted herein. It may be thermal type.

Moreover, in the embodiment of the present invention, the drop of the ink is ejected from the nozzle of the recording head, and the drop strikes the recording medium directly. It may be that the drop ejected from the recording ink strikes a transfer medium, after that the ink placed on the transfer medium is transferred to the recording medium.

EXAMPLES

Hereinafter, the present invention will be described by way of example.

As shown in Table 1, in an image recording device which used a light emitting diode for an ultraviolet-ray irradiation light source, images were recorded by discharging and curing two kinds of ink on various recording media in the case of a recording head of a serial head type and in the case of a recording head of a line head type. As a comparative example, similar image recording was carried out in an image recording device which used a metal halide lamp for an ultraviolet-ray irradiation light source.

TABLE 1

| | | | | Irradiation conditions | | | |
|---|---|---|---|---|---|---|---|
| Sample No. | Ink | Recording material | Surface energy (dyn/cm) | Light source for irradiation | Recording device | Maximum illuminance & peak wavelength on surface of recording material | Remarks |
| Example 1 | Ink 1 | OPP | 38 | LED (article specially made by Nichia Corporation) Electric power consumption of light source: less than 1 kw-hr | FIG. 1 | 100 mW/cm$^2$ - 365 nm | Present invention (more preferable) |
| Example 2 | " | PET | 53 | LED (article specially made by Nichia Corporation) Electric power consumption of light source: less than 1 kw-hr | " | " | Present invention (more preferable) |
| Example 3 | " | Shrink OPS | 39 | LED (article specially made by Nichia Corporation) Electric power consumption of light source: less than 1 kw-hr | " | " | Present invention (more preferable) |
| Example 4 | " | Cast-coated paper | Absorbent recording paper | LED (article specially made by Nichia Corporation) Electric power consumption of light source: less than 1 kw-hr | " | " | Present invention (more preferable) |
| Comparative Example 1 | " | OPP | 38 | 120 W/cm metal halide lamp (made by Japan Storage Battery Co., Ltd., MAL 400NL) 3 kW light source | " | 100 mW/cm$^2$ - 365 nm | Comparison |
| Comparative Example 2 | " | PET | 53 | 120 W/cm metal halide lamp (made by Japan Storage Battery Co., Ltd., MAL 400NL) 3 kW light source | " | " | " |
| Comparative Example 3 | " | Shrink OPS | " | 120 W/cm metal halide lamp (made by Japan Storage Battery Co., Ltd., MAL 400NL) 3 kW light source | " | " | " |
| Comparative Example 4 | " | Cast-coated paper | Absorbent recording paper | 120 W/cm metal halide lamp (made by Japan Storage Battery Co., Ltd., MAL 400NL) 3 kW light source | " | " | " |
| Example 5 | Ink 2 | OPP | 38 | LED (article specially made by Nichia Corporation) Electric power consumption of light source: less than 1 kw-hr | FIG. 1 | 100 mW/cm$^2$ - 365 nm | Present invention |
| Example 6 | " | PET | 53 | LED (article specially made by | " | " | Present invention |

TABLE 1-continued

| Sample No. | Ink | Recording material | Surface energy (dyn/cm) | Light source for irradiation | Recording device | Maximum illuminance & peak wavelength on surface of recording material | Remarks |
|---|---|---|---|---|---|---|---|
| Example 7 | " | Shrink OPS | 39 | LED (article specially made by Nichia Corporation) Electric power consumption of light source: less than 1 kw-hr | " | " | Present invention |
| Example 8 | " | Cast-coated paper | Absorbent recording paper | LED (article specially made by Nichia Corporation) Electric power consumption of light source: less than 1 kw-hr | " | " | Present invention |
| Comparative Example 5 | " | OPP | 38 | 120 W/cm metal halide lamp (made by Japan Storage Battery Co., Ltd., MAL 400NL) 3 kW light source | " | 100 mW/cm² - 365 nm | Comparison |
| Comparative Example 6 | " | PET | 53 | 120 W/cm metal halide lamp (made by Japan Storage Battery Co., Ltd., MAL 400NL) 3 kW light source | " | " | " |
| Comparative Example 7 | " | Shrink OPS | 39 | 120 W/cm metal halide lamp (made by Japan Storage Battery Co., Ltd., MAL 400NL) 3 kW light source | " | " | " |
| Comparative Example 8 | " | Cast-coated paper | Absorbent recording paper | 120 W/cm metal halide lamp (made by Japan Storage Battery Co., Ltd., MAL 400NL) 3 kW light source | " | " | " |
| Example 9 | Ink 3 | OPP | 38 | LED (article specially made by Nichia Corporation) Electric power consumption of light source: less than 1 kw-hr | FIG. 2 | 100 mW/cm² - 365 nm | Present invention |
| Example 10 | " | PET | 53 | LED (article specially made by Nichia Corporation) Electric power consumption of light source: less than 1 kw-hr | " | " | Present invention |
| Example 11 | " | Shrink OPS | 39 | LED (article specially made by Nichia Corporation) Electric power consumption of light source: less than 1 kw-hr | " | " | Present invention |
| Example 12 | " | Cast-coated paper | Absorbent recording paper | LED (article specially made by Nichia Corporation) Electric power consumption of light source: less than 1 kw-hr | " | " | Present invention |
| Comparative Example 9 | " | OPP | 38 | 120 W/cm metal halide lamp (made by Japan Storage Battery Co., Ltd., MAL 400NL) 3 kW light source | " | 100 mW/cm² - 365 nm | Comparison |
| Comparative Example 10 | " | PET | 53 | 120 W/cm metal halide lamp (made by Japan Storage Battery Co., Ltd., MAL 400NL) 3 kW light source | " | " | " |

TABLE 1-continued

| Sample No. | Ink | Recording material | Surface energy (dyn/cm) | Irradiation conditions | | | Remarks |
|---|---|---|---|---|---|---|---|
| | | | | Light source for irradiation | Recording device | Maximum illuminance & peak wavelength on surface of recording material | |
| Comparative Example 11 | " | Shrink OPS | 39 | 120 W/cm metal halide lamp (made by Japan Storage Battery Co., Ltd., MAL 400NL) 3 kW light source | " | " | " |
| Comparative Example 12 | " | Cast-coated paper | Absorbent recording paper | 120 W/cm metal halide lamp (made by Japan Storage Battery Co., Ltd., MAL 400NL) 3 kW light source | " | " | " |
| Example 13 | Ink 4 | OPP | 38 | LED (article specially made by Nichia Corporation) Electric power consumption of light source: less than 1 kw-hr | FIG. 2 | 100 mW/cm$^2$ - 365 nm | Present invention (more preferable) |
| Example 14 | " | PET | 53 | LED (article specially made by Nichia Corporation) Electric power consumption of light source: less than 1 kw-hr | " | " | Present invention (more preferable) |
| Example 15 | " | Shrink OPS | 39 | LED (article specially made by Nichia Corporation) Electric power consumption of light source: less than 1 kw-hr | " | " | Present invention (more preferable) |
| Example 16 | " | Cast-coated paper | Absorbent recording paper | LED (article specially made by Nichia Corporation) Electric power consumption of light source: less than 1 kw-hr | " | " | Present invention (more preferable) |
| Comparative Example 13 | " | OPP | 38 | 120 W/cm metal halide lamp (made by Japan Storage Battery Co., Ltd., MAL 400NL) 3 kW light source | " | 100 mW/cm$^2$ - 365 nm | Comparison |
| Comparative Example 14 | " | PET | 53 | 120 W/cm metal halide lamp (made by Japan Storage Battery Co., Ltd., MAL 400NL) 3 kW light source | " | " | " |
| Comparative Example 15 | " | Shrink OPS | 39 | 120 W/cm metal halide lamp (made by Japan Storage Battery Co., Ltd., MAL 400NL) 3 kW light source | " | " | " |
| Comparative Example 16 | " | Cast-coated paper | Absorbent recording paper | 120 W/cm metal halide lamp (made by Japan Storage Battery Co., Ltd., MAL 400NL) 3 kW light source | " | " | " |
| Example 17 | Ink 5 | OPP | 38 | LED (article specially made by Nichia Corporation) Electric power consumption of light source: less than 1 kw-hr | FIG. 2 | 100 mW/cm$^2$ - 365 nm | Present invention (more preferable) |
| Example 18 | " | PET | 53 | LED (article specially made by Nichia Corporation) Electric power consumption of light source: less than 1 kw-hr | " | " | Present invention (more preferable) |
| Example 19 | " | Shrink OPS | 39 | LED (article specially made by Nichia Corporation) Electric power consumption of light source: less than 1 kw-hr | " | " | Present invention (more preferable) |

TABLE 1-continued

| Sample No. | Ink | Recording material | Surface energy (dyn/cm) | Light source for irradiation | Recording device | Maximum illuminance & peak wavelength on surface of recording material | Remarks |
|---|---|---|---|---|---|---|---|
| Example 20 | " | Cast-coated paper | Absorbent recording paper | LED (article specially made by Nichia Corporation) Electric power consumption of light source: less than 1 kw-hr | " | " | Present invention (more preferable) |
| Comparative Example 17 | " | OPP | 38 | 120 W/cm metal halide lamp (made by Japan Storage Battery Co., Ltd., MAL 400NL) 3 kW light source | " | 100 mW/cm$^2$ - 365 nm | Comparison |
| Comparative Example 18 | " | PET | 53 | 120 W/cm metal halide lamp (made by Japan Storage Battery Co., Ltd., MAL 400NL) 3 kW light source | " | " | " |
| Comparative Example 19 | " | Shrink OPS | 39 | 120 W/cm metal halide lamp (made by Japan Storage Battery Co., Ltd., MAL 400NL) 3 kW light source | " | " | " |
| Comparative Example 20 | " | Cast-coated paper | Absorbent recording paper | 120 W/cm metal halide lamp (made by Japan Storage Battery Co., Ltd., MAL 400NL) 3 kW light source | " | " | " |
| Example 21 | Ink 6 | OPP | 38 | LED (article specially made by Nichia Corporation) Electric power consumption of light source: less than 1 kw-hr | FIG. 2 | 100 mW/cm$^2$ - 365 nm | Present invention (more preferable) |
| Example 22 | " | PET | 53 | LED (article specially made by Nichia Corporation) Electric power consumption of light source: less than 1 kw-hr | " | " | Present invention (more preferable) |
| Example 23 | " | Shrink OPS | 39 | LED (article specially made by Nichia Corporation) Electric power consumption of light source: less than 1 kw-hr | " | " | Present invention (more preferable) |
| Example 24 | " | Cast-coated paper | Absorbent recording paper | LED (article specially made by Nichia Corporation) Electric power consumption of light source: less than 1 kw-hr | " | " | Present invention (more preferable) |
| Comparative Example 21 | " | OPP | 38 | 120 W/cm metal halide lamp (made by Japan Storage Battery Co., Ltd., MAL 400NL) 3 kW light source | " | 100 mW/cm$^2$ - 365 nm | Comparison |
| Comparative Example 22 | " | PET | 53 | 120 W/cm metal halide lamp (made by Japan Storage Battery Co., Ltd., MAL 400NL) 3 kW light source | " | " | " |
| Comparative Example 23 | " | Shrink OPS | 39 | 120 W/cm metal halide lamp (made by Japan Storage Battery Co., Ltd., MAL 400NL) 3 kW light source | " | " | " |
| Comparative Example 24 | " | Cast-coated paper | Absorbent recording paper | 120 W/cm metal halide lamp (made by Japan Storage Battery Co., Ltd., MAL 400NL) 3 kW light source | " | " | " |

The ultraviolet-ray irradiation light source which uses the light emitting diode is a product custom-made by Nichia Corporation. A peak wavelength is 365 nm (nominal value), a maximum illuminance on the recording medium is 100 mW/cm$^2$, and power consumption is less than 1 kw/h. The ultraviolet-ray irradiation light source which uses the metal halide lamp is an MAL 400NL made by Japan Storage Battery Co., Ltd. A peak wavelength is 365 nm (nominal value), a maximum illuminance on the recording medium is 650 mW/cm$^2$, and a power supply of 3 kW is required.

The luminance of the light emitting diode is measured by the spectro illumination photometer, Model UVPF-A1, which is manufactured by IWASAKI ELECTRIC Co., Ltd. In more detail, the spectro illumination photometer is placed apart from the light source in a distance equal to the distance H between the light source and the surface of the recording medium. The luminance of the light emitting diode is measured as equivalence of the luminance on the recording medium.

The inks 1 to 6 were prepared as follows. Into a stainless beaker were charged 5 weight % of PB822 (Ajinomoto Fine Techno) and individual photopolymerizable compounds whose kinds and amounts were shown in Tables 2 to 7. The whole was stirred and mixed for 1 hour under heating on a hot plate of 65° C. to dissolve them each other. Thereto were added color materials whose kinds and amounts were shown in individual tables together with 200 g of zirconia beads having a diameter of 1 mm, and then the vessel was tightly sealed. After 2 hours of dispersion treatment on a paint shaker, the zirconia beads were removed and then the photoinitiator(s) and sensitizer shown in individual tables were added, followed by stirring and mixing. In order to prevent the clogging of a printer, the mixture was filtrated through a 0.8 μm membrane filter to obtain Ink composition K.

The viscosities of each inks are shown below. The viscosity is measured by MCR (Modular Compact Rheometer) 300 produced by Physica. The above value of the viscosity is obtained at shear rate 1000 (1/S).

TABLE 2

Composition of Ink 1 (more preferable)

| | | K (wt %) | C (wt %) | M (wt %) | Y (wt %) | W (wt %) | Lk (wt %) | Lc (wt %) | Lm (wt %) | Ly (wt %) |
|---|---|---|---|---|---|---|---|---|---|---|
| Color material | | CI pigment Black 7 | CI pigment Blue 15:3 | CI pigment Red 57:1 | CI pigment Yellow 13 | Titanium oxide (anatase type, particle size 0.2 μ) | CI pigment Black 7 | CI pigment Blue 15:3 | CI pigment Red 57:1 | CI pigment Yellow 13 |
| Color material | | 5.0 | 2.5 | 3.0 | 2.5 | 5.0 | 1.3 | 0.6 | 0.8 | 0.5 |
| Photopolymerizable compound (epoxidized soybean oil, approved by FDA) | Adekasizer O-130P (Asahi Denka Kogyo) | 8.0 | 8.0 | 8.0 | 8.0 | 8.0 | 8.0 | 8.0 | 8.0 | 8.0 |
| Photopolymerizable compound (oxetane compound) | Oxetane 1 | 20.0 | 15.0 | 15.0 | 15.0 | 20.0 | 15.0 | 15.0 | 15.0 | 15.0 |
| Photopolymerizable compound (oxetane compound) | Oxetane 2 | 9.9 | 17.4 | 16.9 | 17.4 | 9.9 | 18.6 | 19.3 | 19.1 | 19.3 |
| Photopolymerizable compound (oxetane compound) | OXT-221 (Toagosei Co., Ltd.) | 25.0 | 25.0 | 25.0 | 25.0 | 25.0 | 25.0 | 25.0 | 25.0 | 25.0 |
| Acid-multiplying agent | Compound 2 | 3.0 | 3.0 | 3.0 | 3.0 | 3.0 | 3.0 | 3.0 | 3.0 | 3.0 |
| Basic compound | N-Ethyldiethanolamine | 0.01 | 0.01 | 0.01 | 0.01 | 0.01 | 0.01 | 0.01 | 0.01 | 0.01 |
| Thermal base generating agent | Thermal base 2 | 0.1 | 0.1 | 0.1 | 0.1 | 0.1 | 0.1 | 0.1 | 0.1 | 0.1 |
| Photo-cationic initiator | Initiator 1 | 1.5 | 1.5 | 1.5 | 1.5 | 1.5 | 1.5 | 1.5 | 1.5 | 1.5 |
| Photo-cationic initiator | Initiator 2 | 1.5 | 1.5 | 1.5 | 1.5 | 1.5 | 1.5 | 1.5 | 1.5 | 1.5 |
| Sensitizer (anthracene derivative) | CS7201 (Nippon Soda Co., Ltd.) | 1.0 | 1.0 | 1.0 | 1.0 | 1.0 | 1.0 | 1.0 | 1.0 | 1.0 |
| Dispersant | PB822 (Ajinomoto Fine Techno) | 5.0 | 5.0 | 5.0 | 5.0 | 5.0 | 5.0 | 5.0 | 5.0 | 5.0 |

TABLE 2-continued
Composition of Ink 1 (more preferable)
K (wt %)   C (wt %)   M (wt %)   Y (wt %)   W (wt %)   Lk (wt %)   Lc (wt %)   Lm (wt %)   Ly (wt %)
Initiator 1
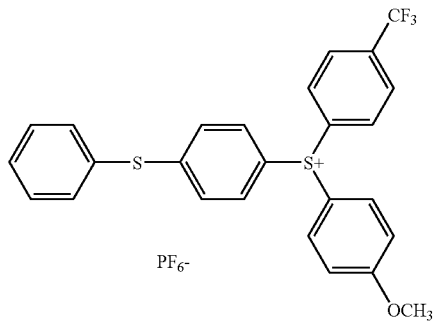
Initiator 2
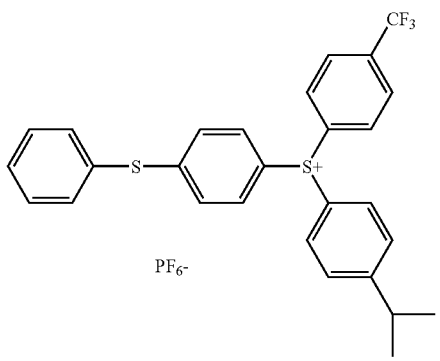
Thermal base 2
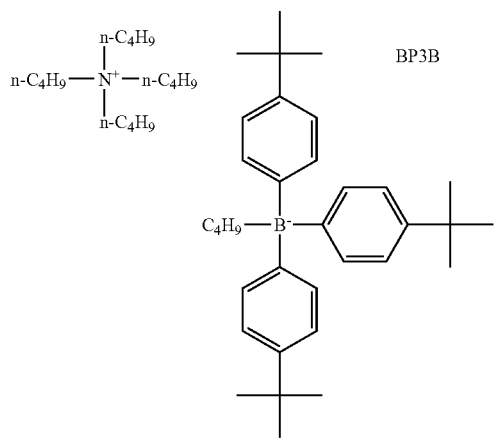
Compound 2
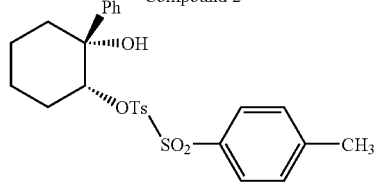

TABLE 2-continued

Composition of Ink 1 (more preferable)

| | K (wt %) | C (wt %) | M (wt %) | Y (wt %) | W (wt %) | Lk (wt %) | Lc (wt %) | Lm (wt %) | Ly (wt %) |
|---|---|---|---|---|---|---|---|---|---|

Oxetane 1: H$_3$CO—[oxetane]—CH$_2$CH$_2$—[oxetane]—OCH$_3$ (with ethyl substituents)

Oxetane 2: H$_3$C—[oxetane]—CH$_2$CH$_2$CH$_2$—[oxetane]—CH$_3$ (with ethyl substituents)

Oxetane 3: [dimethyl-oxetane]—CH$_2$CH$_2$—[dimethyl-oxetane]

TABLE 3

Composition of Ink 2

| | | K (wt %) | C (wt %) | M (wt %) | Y (wt %) | W (wt %) | Lk (wt %) | Lc (wt %) | Lm (wt %) | Ly (wt %) |
|---|---|---|---|---|---|---|---|---|---|---|
| Color material | | CI pigment Black 7 | CI pigment Blue 15:3 | CI pigment Red 57:1 | CI pigment Yellow 13 | Titanium oxide (anatase type, size 0.2µ) | CI pigment Black 7 | CI pigment Blue 15:3 | CI pigment Red 57:1 | CI pigment Yellow 13 |
| Color material | | 3.5 | 2 | 3 | 25 | 3.5 | 3.5 | 3.5 | 3.5 | 3.5 |
| Photopolymerizable compound | Lauryl acrylate (monofunctional) | 25 | 20 | 25 | 20 | 20 | 20 | 20 | 20 | 20 |
| Photopolymerizable compound | Tetraethylene glycol diacrylate (bifunctional) | 17.5 | 23.5 | 19.5 | 20.0 | 19.0 | 19.0 | 19.0 | 19.0 | 19.0 |
| Photopolymerizable compound | Caprolactam-modified dipenta-erythrytol hexaacrylate (hexafunctional) | 20 | 22 | 20 | 25 | 25 | 25 | 25 | 25 | 25 |
| Photo-radical initiator | Irgacure 1800 Ciba Specialty Chemicals | 5 | 5 | 5 | 5 | 5 | 5 | 5 | 5 | 5 |
| Photo-radical initiator | Irgacure 500 Ciba Specialty Chemicals | 3.5 | 2 | 2 | 2 | 2 | 2 | 2 | 2 | 2 |
| Photo-radical initiator | Diethylthioxanthone | 0.5 | 0.5 | 0.5 | 0.5 | 0.5 | 0.5 | 0.5 | 0.5 | 0.5 |
| Dispersant | PB822 (Ajinomoto Fine Techno) | 5.0 | 5.0 | 5.0 | 5.0 | 5.0 | 5.0 | 5.0 | 5.0 | 5.0 |

TABLE 4

Composition of Ink 3

| | | K (wt %) | C (wt %) | M (wt %) | Y (wt %) | W (wt %) |
|---|---|---|---|---|---|---|
| Color material | | CI pigment Black 7 | CI pigment Blue 15:3 | CI pigment Red 57:1 | CI pigment Yellow 13 | Titanium oxide (anatase type, particle size 0.2µ) |
| Color material | | 5 | 2.5 | 3 | 2.5 | 5 |
| Photopolymerizable compound | Lauryl acrylate (monofunctional) | 25 | 20 | 25 | 20 | 20 |

TABLE 4-continued

Composition of Ink 3

| | | K (wt %) | C (wt %) | M (wt %) | Y (wt %) | W (wt %) |
|---|---|---|---|---|---|---|
| Photopolymerizable compound | Tetraethylene glycol diacrylate (bifunctional) | 11.0 | 15.0 | 14.5 | 15.0 | 17.5 |
| Photopolymerizable compound | Trimethylolpropane triacrylate (trifunctional) | 25 | 30 | 25 | 30 | 25 |
| Photo-radical initiator | Irgacure 1850 Ciba Specialty Chemicals | 5 | 5 | 5 | 5 | 5 |
| Photo-radical initiator | Irgacure 651 Ciba Specialty Chemicals | 3.5 | 2 | 2 | 2 | 2 |
| Photo-radical initiator | Diethylthioxanthone | 0.5 | 0.5 | 0.5 | 0.5 | 0.5 |
| Dispersant | PB822 (Ajinomoto Fine Techno) | 5.0 | 5.0 | 5.0 | 5.0 | 5.0 |

TABLE 5

Composition of Ink 4 (more preferable)

| | | K (wt %) | C (wt %) | M (wt %) | Y (wt %) | W (wt %) |
|---|---|---|---|---|---|---|
| Color material | | CI pigment Black 7 | CI pigment Blue 15:3 | CI pigment Red 57:1 | CI pigment Yellow 13 | Titanium oxide (anatase type, particle size 0.2μ) |
| Color material | | 5.0 | 2.5 | 3.0 | 2.5 | 5.0 |
| Photopolymerizable compound (epoxidized soybean oil, approved by FDA) | Adekasizer O-130P (Asahi Denka Kogyo) | 8.4 | 15.8 | 15.4 | 15.9 | 8.4 |
| Photopolymerizable compound (oxetane compound) | Oxetane 2 | 20.0 | 15.0 | 15.0 | 15.0 | 20.0 |
| Photopolymerizable compound (oxetane compound) | Oxetane 3 | 25.0 | 26.0 | 25.0 | 25.0 | 25.0 |
| Photopolymerizable compound (oxetane compound) | OXT-211 (Toagosei Co., Ltd.) | 10.0 | 10.0 | 10.0 | 10.0 | 10.0 |
| Acid-multiplying agent | Compound 2 | 3.0 | 3.0 | 3.0 | 3.0 | 3.0 |
| Basic compound | N-Ethyldiethanolamine | 0.01 | 0.01 | 0.01 | 0.01 | 0.01 |
| Thermal base generating agent | Thermal base 2 | 0.1 | 0.1 | 0.1 | 0.1 | 0.1 |
| Photo-cationic initiator | Initiator 2 | 2.5 | 2.5 | 2.5 | 2.5 | 2.5 |
| Sensitizer (anthracene derivative) | DBA (Kawasaki Kasei Kogyo) | 1.0 | 1.0 | 1.0 | 1.0 | 1.0 |
| Dispersant | PB822 (Ajinomoto Fine Techno) | 5.0 | 5.0 | 5.0 | 5.0 | 5.0 |

TABLE 6

Composition of Ink 5

| | | K (wt %) | C (wt %) | M (wt %) | Y (wt %) | W (wt %) |
|---|---|---|---|---|---|---|
| Color material | | CI pigment Black 7 | CI pigment Blue 15:3 | CI pigment Red 57:1 | CI pigment Yellow 13 | Titanium oxide (anatase type, particle size 0.2μ) |
| Color material | | 5 | 2.5 | 2 | 2.5 | 5 |
| Photopolymerizable compound | NK ester A-400 (Shin-Nakamura Chemical) | 25 | 20 | 25 | 20 | 20 |
| Water | Pure water | 47.2 | 54.7 | 49.2 | 54.7 | 52.2 |
| Water-soluble organic solvent | Diethylene glycol (reagent) | 5 | 5 | 5 | 5 | 5 |
| Water-soluble organic solvent | Isopropyl alcohol (reagent) | 12 | 12 | 12 | 12 | 12 |
| Photo-radical initiator | Irgacure 2959 Ciba Specialty Chemicals | 0.4 | 0.4 | 0.4 | 0.4 | 0.4 |
| Photo-radical initiator | Irgacure 651 Ciba Specialty Chemicals | 0.4 | 0.4 | 0.4 | 0.4 | 0.4 |

TABLE 6-continued

| | | Composition of Ink 5 | | | | |
|---|---|---|---|---|---|---|
| | | K (wt %) | C (wt %) | M (wt %) | Y (wt %) | W (wt %) |
| Dispersant | PB822 (Ajinomoto Fine Techno) | 5.0 | 5.0 | 5.0 | 5.0 | 5.0 |

TABLE 7

| | | Composition of Ink 6 | | | | |
|---|---|---|---|---|---|---|
| | | K (wt %) | C (wt %) | M (wt %) | Y (wt %) | W (wt %) |
| Color material | | CI pigment Black 7 | CI pigment Blue 15:3 | CI pigment Red 57:1 | CI pigment Yellow 13 | Titanium oxide (anatase type, particle size 0.2 μ) |
| Color material | | 4.0 | 4.0 | 5.0 | 5.0 | 5.0 |
| Photopolymerizable compound (oxetane compound) | OXT-221 (Toagosei Co., Ltd.) | 25.0 | 25.0 | 25.0 | 25.0 | 25.0 |
| Photopolymerizable (oxetane compound) | Compound E-1 | 10.0 | 10.0 | 10.0 | 10.0 | 10.0 |
| Photopolymerizable compound (oxetane compound) | OXT-2121 (Toagosei Co., Ltd.) | 10.0 | 10.0 | 10.0 | 10.0 | 10.0 |
| Photopolymerizable compound (epoxidized fatty acid butyl) | E-4030 (Shin-Nippon Rika) | 10.9 | 10.9 | 9.9 | 9.9 | 9.9 |
| Photopolymerizable compound (alicyclic epoxy compound) | Compound EP-1 | 20.0 | 20.0 | 20.0 | 20.0 | 20.0 |
| Polyether polyol | PNT-40 (Nippon Nyukazai Co., Ltd.) | 5.0 | 5.0 | 5.0 | 5.0 | 5.0 |
| Basic compound | N-Ethyldiethanolamine | 0.1 | 0.1 | 0.1 | 0.1 | 0.1 |
| Fluorinated nonionic surfactant | Megafac F475 (Dainippon Ink And Chemicals, Inc.) | 0.02 | 0.02 | 0.02 | 0.02 | 0.02 |
| Anisol (compatibilizer) | HichemicMB (Toho Chemical Industry Co., Ltd.) | 5.00 | 5.00 | 5.00 | 5.00 | 5.00 |
| Thermal acid generating agent | SP152 (Asahi Denka Kogyo) | 5.0 | 5.0 | 5.0 | 5.0 | 5.0 |
| Dispersant | PB822 (Ajinomoto Fine Techno) | 5.0 | 5.0 | 5.0 | 5.0 | 5.0 |

Compound E-1

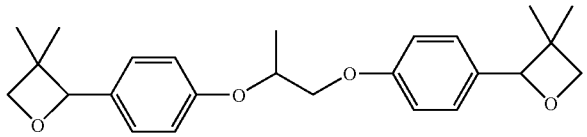

Epoxy EP-1

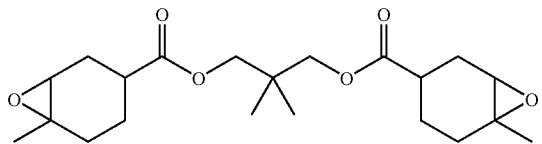

As recording media, a medium made of oriented polypropylene OPP), 600 mm in width and 500 mm in length, a medium made of polyethylene terephthalate (PET), a medium made of shrinkable oriented polystyrene (commercial OPS for shrinking purpose), and cast-coated paper were used. Surface energies were respectively 38 (dyn/cm), 53 (dyn/cm) and 39 (dyn/cm) for the OPP, the PET and the shrinkable OPS.

An ink supply system comprised an ink tank, a supply pipe, a front room ink tank immediately before a head, a pipe equipped with a filter, and a piezohead. Heat was insulated from the front room tank to the head portion, and heating of 50° C. was carried out. The piezohead was driven so as to discharge a multisize dot of 2 to 15 pl at resolution of 720×720 dpi, and each ink was continuously discharged. Here, the dpi indicates the number of dots per 2.54 cm. Within 2 seconds after the ink landed on the recording medium, the recording medium was irradiated with ultraviolet rays by the ultraviolet-ray irradiation devices disposed on both sides of the carriage to cure the ink. A film thickness of the cured ink was measured to be 2.3 to 13 μm.

For each image recorded under the aforementioned conditions, presence of curls or waves on the recording medium, character quality and presence of color mixing (bleeding) were evaluated. Results are shown in Table 8.

Further, bad smell of Examples 8 and 12, and Comparative Example 8 and 12 were evaluated. Results are also shown in Table 8.

TABLE 8

| Sample No. | Wrinkles, Curl | Character quality | Color mixing (bleeding) | Bad Smell |
|---|---|---|---|---|
| Example 1 | ○ | ⊚ | ○ | |
| Example 2 | ○ | ⊚ | ○ | |
| Example 3 | ○ | ⊚ | ⊚ | |
| Example 4 | ○ | ⊚ | ⊚ | |
| Comp. Example 1 | X | Δ | ○ | |
| Comp. Example 2 | X | ○ | ○ | |
| Comp. Example 3 | X | Δ | ⊚ | |
| Comp. Example 4 | Δ | Δ | ⊚ | |
| Example 5 | ○ | ○ | ○ | |
| Example 6 | ○ | ○ | ⊚ | |
| Example 7 | Δ | ⊚ | ⊚ | |
| Example 8 | ○ | ⊚ | ⊚ | ○ |
| Comp. Example 5 | X | ○ | ○ | |
| Comp. Example 6 | X | ○ | Δ | |
| Comp. Example 7 | X | Δ | ○ | |
| Comp. Example 8 | X | ○ | ○ | X |
| Example 9 | ○ | ○ | ○ | |
| Example 10 | ○ | ○ | Δ | |
| Example 11 | Δ | ○ | ○ | |
| Example 12 | ○ | ○ | ○ | ○ |
| Comp. Example 9 | X | X | ○ | |
| Comp. Example 10 | X | X | Δ | |
| Comp. Example 11 | X | X | ○ | |
| Comp. Example 12 | X | Δ | ○ | X |
| Example 13 | ○ | ○ | ○ | |
| Example 14 | ○ | ○ | ○ | |
| Example 15 | ○ | ○ | ○ | |
| Example 16 | ○ | ○ | ○ | |
| Comp. Example 13 | X | Δ | ○ | |
| Comp. Example 14 | X | Δ | ○ | |
| Comp. Example 15 | X | X | ○ | |
| Comp. Example 16 | Δ | Δ | ○ | |
| Example 17 | ○ | Δ | ○ | |
| Example 18 | ○ | ○ | Δ | |
| Example 19 | ○ | ○ | ○ | |
| Example 20 | ○ | ○ | ○ | |
| Comp. Example 17 | X | Δ | ○ | |
| Comp. Example 18 | X | ○ | Δ | |
| Comp. Example 19 | X | X | X | |
| Comp. Example 20 | X | ○ | ○ | |
| Example 21 | ○ | ○ | ○ | |
| Example 22 | ○ | ⊚ | ⊚ | |
| Example 23 | ○ | ○ | ○ | |
| Example 24 | ○ | ⊚ | ⊚ | |
| Comp. Example 21 | X | ○ | ○ | |
| Comp. Example 22 | X | ○ | ○ | |
| Comp. Example 23 | X | ○ | ○ | |
| Comp. Example 24 | Δ | ○ | ○ | |

The evaluation as to the presence of curls or waves on the recording medium was carried out by picking up the recording medium, and irradiating it with ultraviolet rays to cure the ink, thereby visually determining generation of curls or waves on the recording medium. A good state in which there are no curls or waves is indicated by ○, a case in which curls or waves are generated but they can be practically used is indicated by Δ, and a failure state in which curls or waves are generated is indicated by X.

The evaluation as to the character quality was carried out by using an ink of each of colors Y, M, C, and K to print characters based on a 6-point Mincho type font at target concentration, and magnifying character roughness by a magnifier. A case of no character roughness is indicated by ⊚, a case in which slight roughness is identified is indicated by ○, a case in which there is roughness but the character can be recognized to be practically used is indicated by Δ, and a case in which the character is too rough and blurred to be practically used is indicated by X.

The evaluation as to the presence of color mixing (bleeding) was carried out by printing at 720 dpi so that 1 dot of each of colors Y, M, C and K can be adjacent to another, magnifying adjacent color dots by a magnifier, and visually observing a level of color mixing. A case in which shapes of the adjacent dots are maintained perfectly circular and thus there is no color mixing is indicated by ⊚, a case in which shapes of the adjacent dots are maintained almost circular and there is almost no color mixing is indicated by ○, a case in which shapes of the adjacent dots are slightly broken to generate color mixing but they can be practically used is indicated by Δ, and a case in which shapes of the adjacent dots are broken and thus they are not suitable for practical use is indicated by X.

For the presence of curling or waving on the recording medium, in the comparative example, when the recording medium was made of a heat shrinkable material, a state was a failure. However, in the examples of the invention, states were good in almost all cases. For the character quality, qualities were improved in most of the examples compared with the conventional example. For the color mixing, color mixing was reduced more than that of the conventional example when the ink 2 was used.

In the evaluation of bad smell, rolled printing medium, which had 600 mm width and 5 m length, was used, and the grader smelled the rolled printing medium.

A case in which the rolled printing medium does not have bad smell is indicated by ○, a case in which the rolled printing medium has bad smell but practically useable is indicated by Δ, and a case in which the rolled printing medium has bad smell and unpracticed is indicated by X.

According to the invention, the ultraviolet light source comprises the light emitting diode. Thus, since the ultraviolet-ray irradiation device can be made compact, it is possible to miniaturize the entire image recording device. Since the light emitting device generates no heat, when the ultraviolet-ray curable ink is irradiated with ultraviolet rays, even if an image is recorded on the thin film of the soft packing material, it is possible to obtain a good image without generating any curls, waves or the like on the thin film.

Moreover, since the light emitting diode emits a light by small power, power consumption can be suppressed.

According to the invention, since the ultraviolet light source comprises the light emitting diode, the ultraviolet-ray irradiation device can be made lightweight to increase moving speeds of the ultraviolet-ray irradiation device and the recording head, and image recording efficiency.

According to the invention, since the ultraviolet-ray irradiation device is disposed between the recording heads, and the distance between the recording head and the ultraviolet-ray irradiation device is short, the recording medium is irradiated with ultraviolet rays within a short time after the ultraviolet-ray curable ink is discharged from the nozzle of the recording head to land on the recording medium, and thus a high-definition image can be obtained.

According to the invention, the ultraviolet-ray irradiation device is disposed on the rear side of the recording head of the line head type in the recoding medium conveying direction, and the recording medium is moved to irradiate the ultraviolet-ray curable ink discharged from the nozzle of the recording head to land on the recording medium with ultraviolet rays. Thus, it is possible to easily and surely cure the ultraviolet-ray curable ink.

According to the invention, an image can be recorded on the recording medium by low power consumption.

According to the invention, the ultraviolet-ray curable ink has a viscosity of 7 to 50 mPa·s at 25° C., and the ultraviolet-ray curable ink is stably discharged from the nozzle, and cured well when it is irradiated with ultraviolet rays. Thus, it is possible to obtain a good image.

According to the invention, since the ink is the ultraviolet-ray curable ink of the cationic polymerization type, and irradiated with relatively low-illuminance ultraviolet rays to be cured, it is possible to obtain a good image by a low illuminance and low power consumption.

According to the invention, since the ink is the ultraviolet-ray curable ink of the cationic polymerization type, and irradiated with relatively low-illuminance ultraviolet rays to be cured well, it is possible to obtain a good image by a low illuminance and low power consumption.

According to the invention, even on the recording medium of the material which does not absorb the ultraviolet-ray curable ink, it is possible to obtain a good image by discharging the ink and irradiating the ink with ultraviolet rays to cure it.

According to the invention, the ultraviolet-ray curable ink is irradiated with ultraviolet rays by the ultraviolet light source which comprises the light emitting diode, but the light emitting diode generates no heat. Thus, when the ultraviolet-ray curable ink is irradiated with ultraviolet rays, even if an image is recorded on the thin film of the soft packing material, it is possible to obtain a good image without generating any curls, waves or the like on the thin film. Additionally, since the ultraviolet light source can be made compact, an image can be recorded by the compact image recording device. Moreover, since the light emitting diode emits a light by small power, it is possible to record an image by low power consumption.

According to the invention, the recording medium is irradiated with ultraviolet rays by the ultraviolet-ray irradiation device within 0.001 to 1.0 seconds after the ultraviolet-ray curable ink lands on the recording medium to cure the ink before it is spread on the recording medium. Thus, it is possible to obtain a high-definition image.

According to the invention, since the amount of the ink droplet discharged from the nozzle is 1 to 15 pl, it is possible to obtain a high-definition image.

According to the invention, since a total ink film thickness is 2 to 20 µm after the ultraviolet-ray curable ink is irradiated with ultraviolet rays to be cured, for example, even if the ultraviolet-ray curable ink is discharged to be cured on the thin film of the soft packing material, no curls or waves are generated, and the texture of the entire print is not lost. Thus, it is possible to obtain a good image.

What is claimed is:

1. An image recording device, comprising:
    a recording head having a nozzle to discharge an ultraviolet-ray curable ink which is cured as irradiated with ultraviolet rays; and
    an ultraviolet-ray irradiation device having an ultraviolet light source to generate ultraviolet rays to cure the ultraviolet-ray curable ink, the ultraviolet light source comprising a light emitting diode which generates the ultraviolet rays having an emission wavelength peak in a range between 305 and 375 nm, and a maximum illuminance in a range between 40 and 1000 mW/cm$^2$ on a recording medium surface,
    wherein an image is formed by placing the ultraviolet-ray curable ink discharged from the nozzle on a recording medium and by irradiating the ink on the recording medium with ultraviolet rays, and the ultraviolet-ray irradiation device irradiates the ink within 0.001 to 1.0 second after the placing of the ultraviolet-ray curable ink on the recording medium.

2. The image recording device of claim 1,
    wherein the recording head is a serial head system, and the ultraviolet-ray irradiation device is disposed on at least one of front and rear sides of the recording head in a main scanning direction.

3. The image recording device of claim 1,
    wherein the recording head is a line head system, and the ultraviolet-ray irradiation device is disposed on a rear side of the recording head in a conveying direction of the recording medium.

4. The image recording device of claim 1,
    wherein total power consumption of the ultraviolet-ray irradiation device is less than 1 kw/h.

5. The image recording device of claim 1,
    wherein the ultraviolet-ray curable ink has a viscosity of 7 to 50 mPa≡s at 25° C.

6. The image recording device of claim 1,
    wherein the ultraviolet-ray curable ink contains a compound having at least one kind of oxetane ring as photopolymerizable monomer.

7. The image recording device of claim 1,
    wherein the ultraviolet-ray curable ink contains 30 to 95wt % of a compound having at least one kind of oxetane ring, 5 to 70wt % of a compound having least one kind of oxirane group, and 0 to 40wt % of at least one kind of vinyl ether compound as photopolymerizable monomers.

8. The image recording device of claim 1,
    wherein the recording medium is made of a material which does not absorb the ultraviolet-ray curable ink.

9. The image recording device of claim 1,
    wherein the ultraviolet-ray curable ink contains a compound having at least one of acrylic monomer or methacrylic monomer as a photopolymerizable compound.

10. The image recording device of claim 1,
    wherein the ultraviolet-ray curable ink contains 1 to 40wt % of water-soluble monomer.

11. The image recording device of claim 1, wherein the image recording device includes a plurality of recording heads, and the ultraviolet-ray irradiation device is disposed between the respective recording heads.

12. The image recording device of claim 11, wherein the recording head is a serial head system.

13. A method for recording an image on a recording medium, comprising:
    discharging an ultraviolet-ray curable ink, which is cured as irradiated with ultraviolet rays, from a recording head having a nozzle disposed therein to place the ink on the recording medium;
    placing the ink discharged from the nozzle of the recording head on the recording medium; and
    irradiating ultraviolet rays from an ultraviolet light source to the ink on the recording medium to form the image,
    wherein an emission wavelength peak of the ultraviolet light source is in a range between 305 and 375 nm, and a maximum illuminance of the ultraviolet light source is in a range between 40 and 1000 mW/cm$^2$ on a surface of the recording medium to cure the ink, wherein the recording medium is irradiated with the ultraviolet rays by the ultraviolet-ray irradiation device within 0.001 to 1.0 second after the placing of the ultraviolet-ray curable ink on the recording medium.

14. The method of claim 13,
    wherein the amount of an ink droplet discharged from the nozzle is 1 to 15 pl.

15. The method of claim 13,
    wherein a total ink film thickness is 2 to 20 μm after the ultraviolet-ray curable ink placed on the recording medium is irradiated with the ultraviolet rays and is thereby cured.

16. The method of claim 13,
    wherein the light source comprises a light emitting diode.

17. An image recording device, comprising:
    recording means having a nozzle to discharge an ultraviolet-ray curable ink which is cured as irradiated with ultraviolet rays; and
    ultraviolet-ray irradiating means having an ultraviolet light source to generate ultraviolet rays to cure the ultraviolet-ray curable ink, the ultraviolet light source comprising a light emitting diode which generates the ultraviolet rays having an emission wavelength peak in a range between 305 and 375 nm, and a maximum illuminance in a range between 40 and 1000 mW/cm$^2$ on a recording medium surface,
    wherein an image is formed by placing the ultraviolet-ray curable ink discharged from the nozzle on a recording medium and by irradiating the ink on the recording medium with ultraviolet rays, and the ultraviolet-ray irradiation device irradiates the ink within 0.00 1 to 1.0 second after the placing of the ultraviolet-ray curable ink on the recording medium.

18. The image recording device of claim 17, wherein the image recording device includes a plurality of recording heads, and the ultraviolet-ray irradiation device is disposed between the respective recording heads.

19. The image recording device of claim 18, wherein the recording head is a serial head system.

20. The image recording device of claim 17,
    wherein the recording head is a serial head system, and the ultraviolet-ray irradiation device is disposed on at least one of front and rear sides of the recording head in a main scanning direction.

21. The image recording device of claim 17,
    wherein the recording head is a line head system, and the ultraviolet-ray irradiation device is disposed on a rear side of the recording head in a conveying direction of the recording medium.

22. The image recording device of claim 17,
    wherein total power consumption of the ultraviolet-ray irradiation device is less than 1 kw/h.

* * * * *